(12) United States Patent
Taets

(10) Patent No.: US 9,725,586 B2
(45) Date of Patent: *Aug. 8, 2017

(54) STABLE EMULSIONS OF POLYISOBUTENE AND THEIR USE

(71) Applicant: EMULCO LABORATORIES C.V.B.A., Ghent (BE)

(72) Inventor: Lieve Taets, Ghent (BE)

(73) Assignee: EMULCO LABORATORIES C.V.B.A., Ghent (BE)

(*) Notice: Subject to any disclaimer, the term of this patent is extended or adjusted under 35 U.S.C. 154(b) by 0 days.

This patent is subject to a terminal disclaimer.

(21) Appl. No.: 14/414,680

(22) PCT Filed: Jul. 15, 2013

(86) PCT No.: PCT/EP2013/064895
§ 371 (c)(1),
(2) Date: Jan. 13, 2015

(87) PCT Pub. No.: WO2014/012884
PCT Pub. Date: Jan. 23, 2014

(65) Prior Publication Data
US 2015/0175791 A1    Jun. 25, 2015

(30) Foreign Application Priority Data

Jul. 16, 2012   (BE) .................................. 2012/0499
Feb. 12, 2013   (EP) .................................. 13154995.8

(51) Int. Cl.
*C08J 3/09*      (2006.01)
*C08K 5/07*      (2006.01)
*C08L 23/22*     (2006.01)

(52) U.S. Cl.
CPC ............... *C08L 23/22* (2013.01); *C08K 5/07* (2013.01)

(58) Field of Classification Search
None
See application file for complete search history.

(56) References Cited

U.S. PATENT DOCUMENTS

| | | | | | |
|---|---|---|---|---|---|
| 3,579,461 | A | * | 5/1971 | Glaub | B01F 3/0807 106/271 |
| 4,171,295 | A | * | 10/1979 | Frese | C08L 95/005 524/501 |
| 4,468,254 | A | * | 8/1984 | Yokoyama | C08L 91/08 106/271 |
| 4,594,109 | A | * | 6/1986 | Kawabata | C09D 5/008 106/271 |
| 5,346,943 | A | * | 9/1994 | Khungar | C08K 5/0008 106/285 |

(Continued)

*Primary Examiner* — Peter A Salamon
(74) *Attorney, Agent, or Firm* — Knobbe, Martens, Olson & Bear LLP

(57) ABSTRACT

The invention relates to an aqueous polyisobutene emulsion comprising: 1% wt. to 65% wt., based on the total weight of said emulsion, of polyisobutene, —at maximum 5% wt., based on the total weight of said emulsion, of at least one surfactant, and —optionally 1% wt. to 65% wt., based on the total weight of said emulsion, of at least one wax and/or oil, complemented with water to 100% wt., whereby the average particle size of said polyisobutene emulsion is not greater than 100 μm. The present invention also relates to the use of such an emulsion.

10 Claims, 4 Drawing Sheets

(56) References Cited

U.S. PATENT DOCUMENTS

| | | | | |
|---|---|---|---|---|
| 5,421,866 | A * | 6/1995 | Stark-Kasley | C04B 41/009 106/2 |
| 5,743,949 | A * | 4/1998 | Kainz | C08J 3/03 106/131.1 |
| 7,153,516 | B2 * | 12/2006 | Bowen-Leaver | A61K 8/042 424/401 |
| 7,767,748 | B2 * | 8/2010 | Leyrer | C08F 2/24 524/459 |
| 2003/0185782 | A1 * | 10/2003 | Auguste | A61K 8/06 424/70.11 |
| 2004/0154216 | A1 * | 8/2004 | Huffer | B01F 17/0028 44/385 |
| 2008/0274073 | A1 * | 11/2008 | Bell | C08F 222/06 424/78.02 |
| 2009/0197105 | A1 * | 8/2009 | Buchholz | B27N 1/006 428/473.5 |
| 2011/0275738 | A1 * | 11/2011 | Engel | B01F 3/0811 523/351 |
| 2013/0059927 | A1 * | 3/2013 | Boeckh | C08L 23/22 514/772.5 |
| 2015/0203637 | A1 * | 7/2015 | Taets | C08J 3/09 523/122 |

* cited by examiner

STABLE EMULSIONS OF POLYISOBUTENE AND THEIR USE

CROSS-REFERENCE TO RELATED APPLICATIONS

This application is the U.S. National Phase under 35 U.S.C. §371 of International Application PCT/EP2013/064895, filed Jul. 15, 2013, which claims priority to BE 2012/0499, filed Jul. 16, 2012 and EP 13154995.8, filed Feb. 12, 2013.

TECHNICAL FIELD

The invention relates to the field of emulsions of polyisobutene in water. More specifically, the present invention relates to stable emulsions of polyisobutene and their use in chemical-technical applications.

INTRODUCTION

Emulsions or dispersion can be defined as a mixture of two or more non-mixable fluids. The preparation of a dispersion or of a mixture comprises the mixing of two non-mixable fluids, whereby one of these fluids (named "dispersed phase") is dispersed as fine drops in the other fluid (named "dispersant phase"). Emulsions are obtained during an emulsification process whereby a homogeneous mixture is obtained by using a surfactant or a surface-active compound.

Many emulsions are already known. However, making emulsions based on polyolefins and especially polyisobutenes, is known to have some difficulties. Firstly, it is very difficult to obtain a stable emulsion. Also, only stable emulsions based on polyisobutene with a low molecular weight are reported. In addition, de presence of a wax or oil is mandatory. Furthermore, also the presence of an additional polymer is required for the synthesis of such emulsions, dramatically increasing the cost price of such emulsions. Finally, a high mass concentration of one or more surfactants is required.

WO 2011 141496 reports on the synthesis of stable emulsions based on polyisobutene. Polyisobutene with low molecular weight is used with a maximum of 10,000 g/mol. Here also, a functionalized polymer is added.

WO 2007 042454 discloses the synthesis of emulsions based on polyisobutene. Hereby, only syntheses in presence of polymer are reported, whereby emulsions based on polyisobutene with a molecular weight lower than 10,000 g/mol are depicted.

However, it is not yet possible to make stable emulsions based on polyisobutene in absence of a polymer. In addition, it is not yet possible to make emulsions of polyisobutene based on polyisobutene with a high molecular weight. Furthermore, only emulsions based on polyisobutene are reported, which are synthesized with high surfactant concentration. Also, no emulsions are reported based on polyisobutene in absence of a wax and/or oil.

U.S. Pat. No. 7,153,516 describes nanogel compositions whereby an oil is emulsified in water and whereby the average particle size is in the range of the nanometer scale. However, such compositions require an oil phase and a silicone component that self-structure to increase the complex viscosity of the composition and form the nanogel.

Polyisobutene emulsions with low water content, a low surfactant content, a low viscosity and good flowing properties are of great industrial interest since they are easily handled or transported or applied in various technical applications with a relatively low effort or energetic input. Such ease of handling, consequently, would open new prospects for novel technological applications.

In addition, the synthesis of polyisobutene emulsions, especially polyisobutene emulsions with high molecular weight polymer, in water with a relatively low water content is not yet fully understood or documented. In general, to achieve a lower water content of an emulsion or reversely a higher polymer content, one would enhance the amount of surfactant of the emulsion. However, by doing so, this results in an enhanced tackiness and viscosity of the eventually obtained emulsion. A method for the production of polyisobutene emulsions with low water content without the excessive use of surfactant is up to date not yet disclosed.

SUMMARY OF THE INVENTION

In a first aspect, the present invention provides an aqueous polyisobutene emulsion comprising:
  1% wt. to 65% wt., based on the total weight of said emulsion, of polyisobutene,
  at maximum 5% wt., based on the total weight of said emulsion, of at least one surfactant, and
  optionally 1% wt. to 65% wt., based on the total weight of said emulsion, of at least one wax and/or oil, complemented with water to 100% wt.

More specifically, the present invention relates to such an emulsion, whereby the average particle size of said polyisobutene emulsion is not greater than 100 μm.

Since the current invention relates to a polyisobutene emulsion with an average particle size smaller than 100 μm, it thereby provides an emulsion with good stability, good flowing parameters and relatively low viscosity and tackiness.

In a second aspect, the present invention provides an aqueous polyisobutene emulsion obtainable by a process comprising the steps of:
  heating 1% wt. to 65% wt., based on the total weight of said emulsion, polyisobutene polymer, optionally mixing said polyisobutene polymer with 1% wt. to 65% wt., based on the total weight of said emulsion, of a wax and/or oil, thereby obtaining a pre-mix,
  mixing said pre-mix in water containing one or more surfactants in a concentration of said one or more surfactants of at maximum 5% wt. at a controlled flow rate, which flow rate is sufficiently slow to form particles of the pre-mix, thereby obtaining a pre-emulsion, and
  homogenising said pre-emulsion, thereby obtaining said polyisobutene emulsion with an average particle size of not greater than 100 μm.

Some of the advantages provided by the above described process to obtain an aqueous polyisobutene emulsion are that said polyisobutene is distributed efficiently in water, emulsification is much more efficient and distribution of surfactant(s) at the water/polymer interphase is much more optimized. This is especially advantageous in view of the fact that this reduces the high intrinsic tackiness of polyisobutene, thereby providing a high-quality polyisobutene emulsion.

In a third aspect, the present invention provides in the use of an aqueous polyisobutene emulsion in a chemical-technical application, such as glue systems, cosmetic, plant protection, preparation and treatment of paper, production and processing of textiles and leather, coatings, medical or pharmaceutical applications, construction, wood treatment,

DETAILED DESCRIPTION OF THE INVENTION

Figure 1:
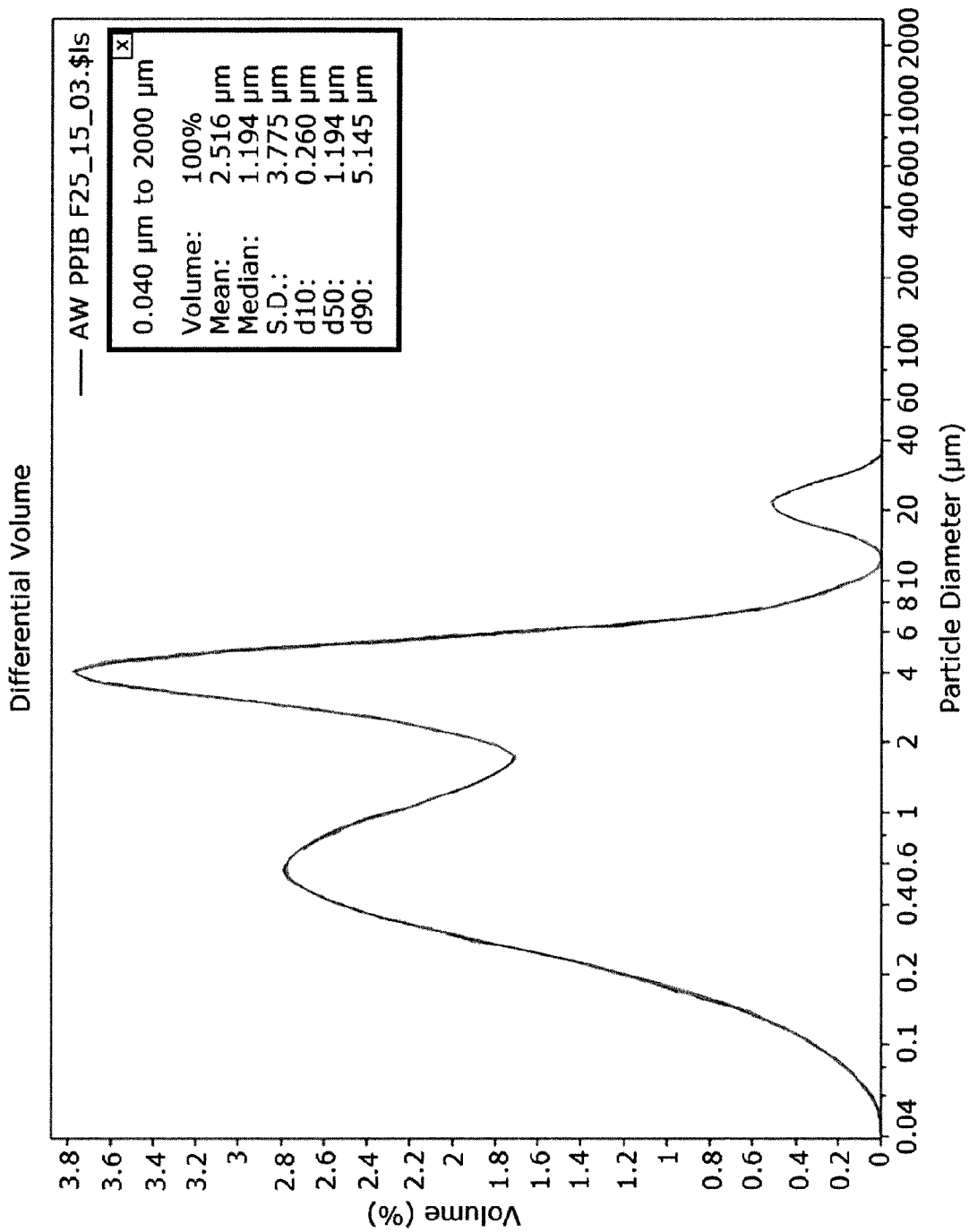
FIG. 1 depicts the particle size distribution of an emulsion prepared according to example 1.
Figure 2:
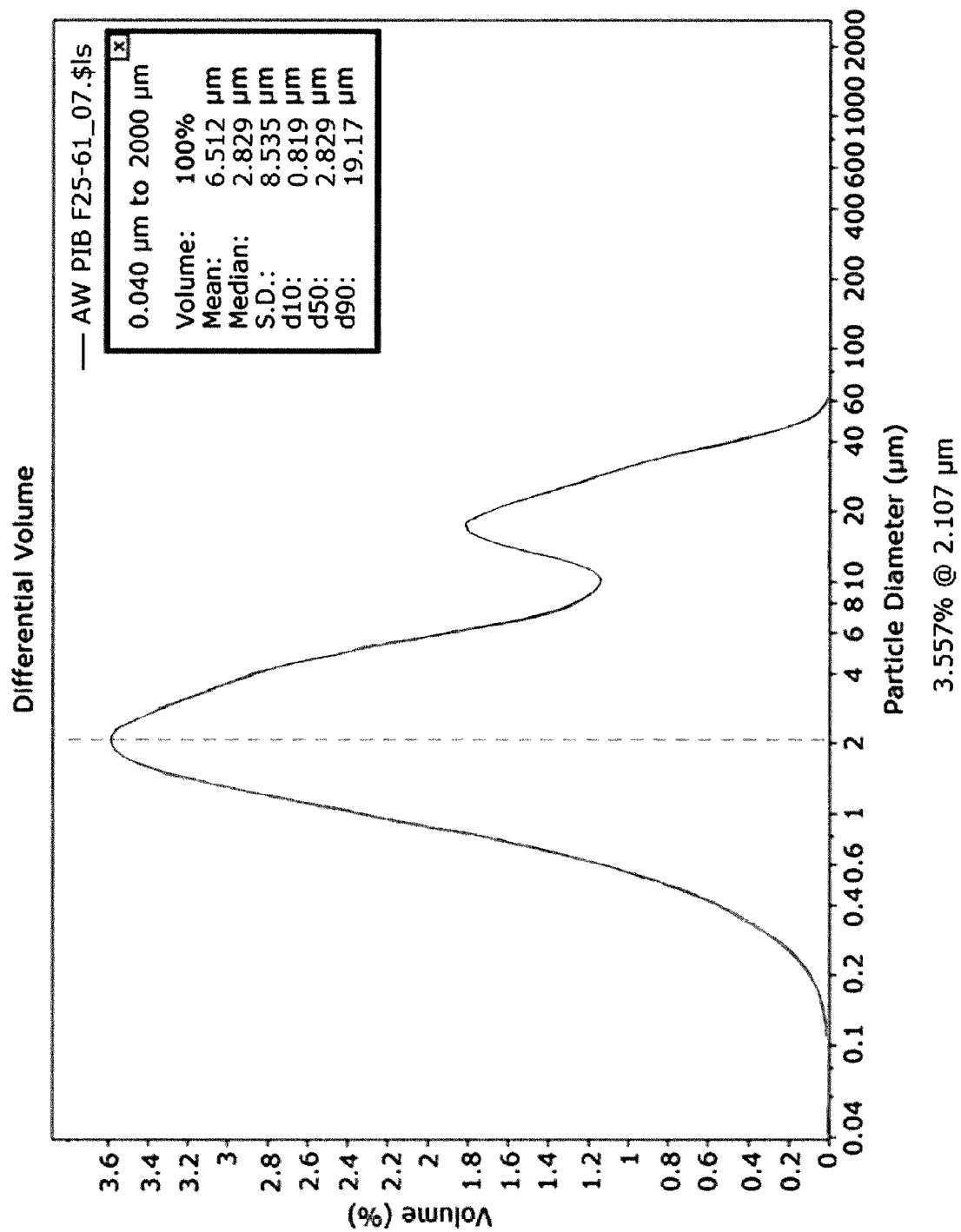
FIG. 2 depicts the particle size distribution of an emulsion prepared according to example 2.
Figure 3:
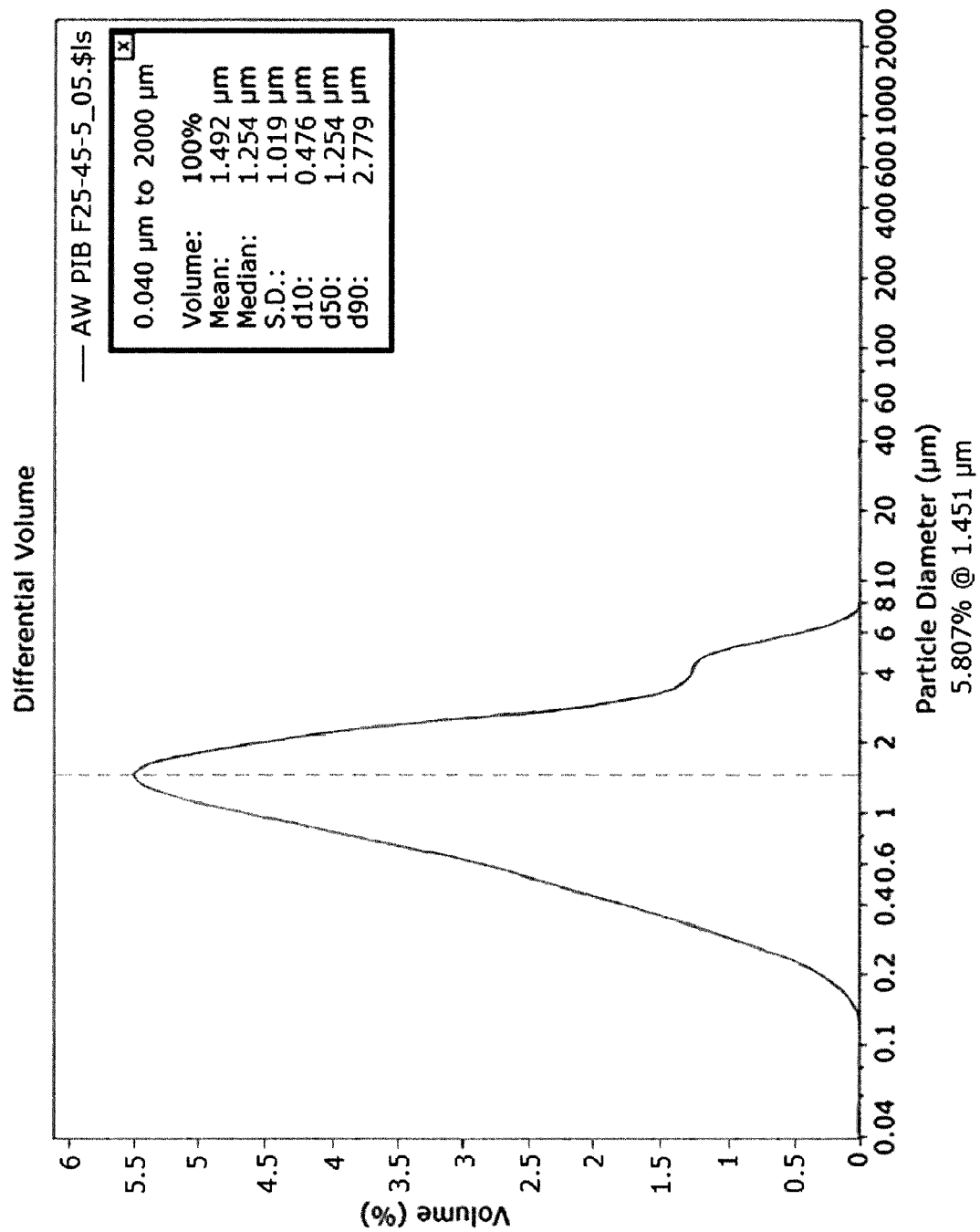
FIG. 3 depicts the particle size distribution of an emulsion prepared according to example 3.
Figure 4:
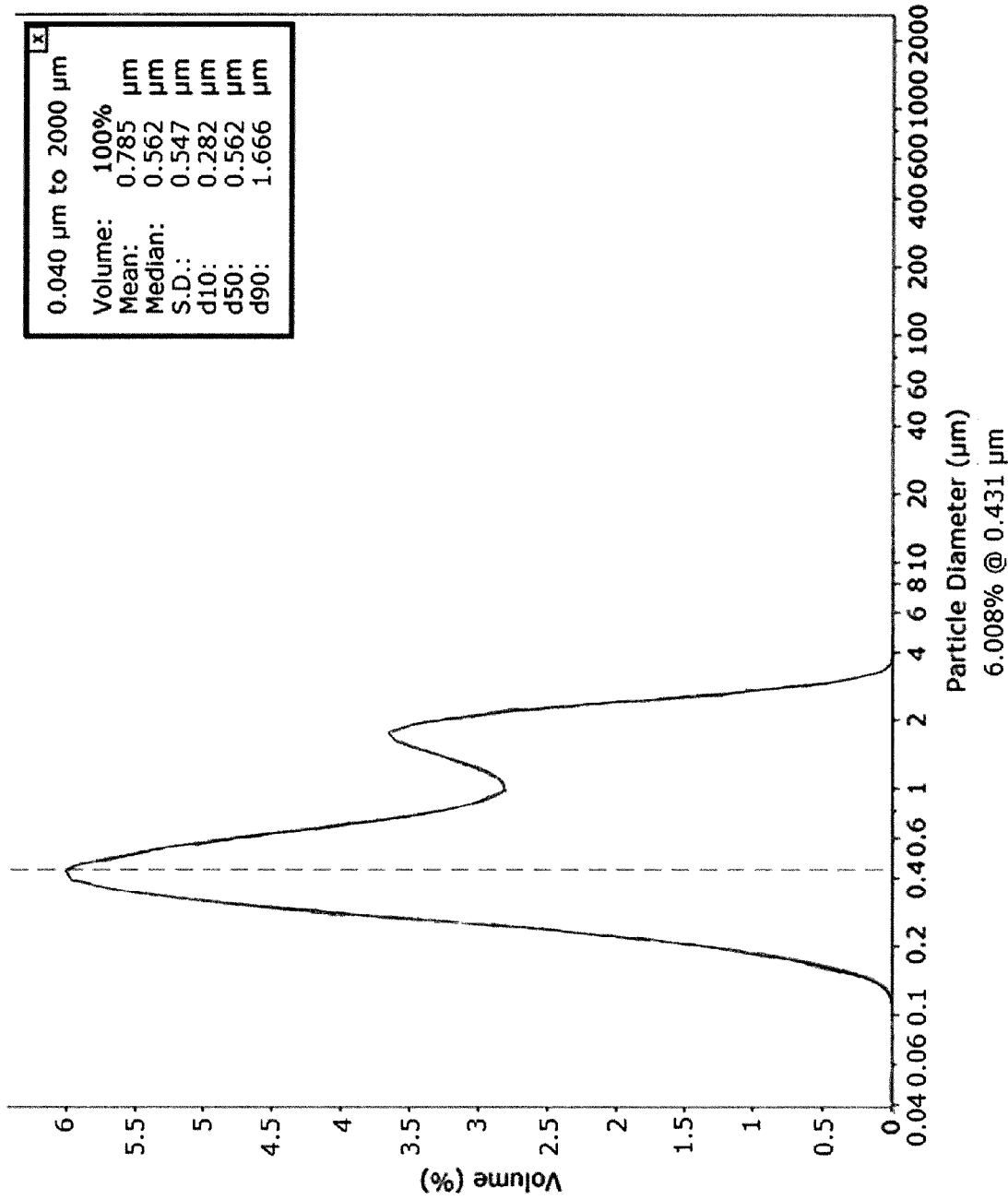
FIG. 4 depicts the particle size distribution of an emulsion prepared according to example 4.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The term "water" is to be understood also as "watery phase" or "aqueous phase," optionally including dissolved products or additives therein.

The term "particle size" of an emulsion is to be understood also as the "droplet size" of that emulsion. The term "average particle size" is also to be understood as the term "mean droplet size."

The recitation of numerical ranges by endpoints includes all numbers and fractions subsumed within that range, as well as the recited endpoints. All percentages are to be understood as percentage by weight and are abbreviated as "% wt.", unless otherwise defined or unless a different meaning is obvious to the person skilled in the art from its use and in the context wherein it is used.

In a first aspect, the present invention provides an aqueous polyisobutene emulsion comprising:
  1% wt. to 65% wt., based on the total weight of said emulsion, of polyisobutene,
  at maximum 5% wt., based on the total weight of said emulsion, of at least one surfactant, and
  optionally 1% wt. to 65% wt., based on the total weight of said emulsion, of at least one wax and/or oil, complemented with water to 100% wt.

In addition, the average particle size of said polyisobutene emulsion is not greater than 100 μm.

Since the current invention relates to a polyisobutene emulsion with at maximum 5% wt. of surfactants and an average particle size smaller than 100 μm, it thereby provides in an emulsion with good stability, good flowing parameters and relatively low viscosity and tackiness.

Furthermore, the viscosity of an aqueous polyisobutene emulsion is related to good flowing properties and is related to the ease of handling and the energetic input that is required for manipulating said emulsion. A comparatively low viscosity generally gives rise to a polyisobutene emulsion with good flowing properties and a low energetic input for manipulation said emulsion.

Some of the advantages provided by the above described aqueous polyisobutene composition is that it contains a relatively low content of water. In several applications, a polyisobutene in water emulsion is used as a carrier for the polyisobutene. After use, water evaporates and leaves a polyisobutene layer. A low content of water reduces the energetic requirements for transporting said emulsion from manufactory to the location where it is applied. Simultaneously, it allows for a high polyisobutene content, thereby providing a maximum usefulness of said emulsion. The good flowing properties allow for ease of handling and lower requirements regarding the energetic input for manipulating said aqueous polyisobutene emulsion. The comparatively small average particle size of the polyisobutene emulsion is inversely related to the long-term stability of said emulsion; a smaller average particle size guaranties a longer shelf-life of said emulsion. This is advantageous, since it reduces the amount of emulsions that expires beyond its useful lifetime due to long storage and thus reduces waste generation. In addition, the use of surfactants is not always environmentally innocent, and the reduced amount of surfactant that is required for the preparation of the disclosed polyisobutene emulsions reduces significantly their environmental impact.

In a more preferred embodiment, said polyisobutene emulsion has an average particle size of not greater than 90 μm. More preferably, said polyisobutene emulsion has an average particle size of not greater than 80 μm. More preferably, said polyisobutene emulsion has an average particle size of not greater than 70 μm. Even more preferably, said polyisobutene emulsion has an average particle size of not greater than 60 μm.

In a preferred embodiment, the present invention provides in an aqueous polyisobutene emulsion, whereby the average particle size of said polyisobutene emulsion is not greater than 50 μm.

In a more preferred embodiment, said polyisobutene emulsion has an average particle size of not greater than 40 μm. More preferably, said polyisobutene emulsion has an average particle size of not greater than 35 μm. More preferably, said polyisobutene emulsion has an average particle size of not greater than 30 μm. Even more preferably, said polyisobutene emulsion has an average particle size of not greater than 25 μm.

In a preferred embodiment, the present invention provides in an aqueous polyisobutene emulsion, whereby the average particle size of said polyisobutene emulsion is not less than 250 nm and not greater than 25 μm.

In a more preferred embodiment, said polyisobutene emulsion has an average particle size comprised between 300 nm and 25 µm. More preferably, said polyisobutene emulsion has an average particle size comprised between 400 nm and 25 µm. Even more preferably, said polyisobutene emulsion has an average particle size comprised between 500 nm and 25 µm. Most preferably, said polyisobutene emulsion has an average particle size comprised between 500 nm, 750 nm, 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 21 µm, 22 µm, 23 µm, 24 µm or any value there in between.

Since the current invention relates to a polyisobutene emulsion with an average particle size smaller than 100 µm, it thereby provides an emulsion with good stability, good flowing parameters and relatively low viscosity and tackiness.

In a preferred embodiment, the present invention provides in an aqueous polyisobutene emulsion, wherein said polyisobutene is comprised in an amount between 5% wt. and 60% wt., based on the total weight of said emulsion.

Polyisobutene is a polymer based on isobutene as fundamental compound. Polyisobutene exists in different molecular weights. Low molecular weight is understood as a molecular weight up to 2500 g/mol, medium molecular weight is understood from 2501 g/mol to 100000 g/mol and high molecular weight is understood as 100001 g/mol to 500000 g/mol.

Polyisobutene with various molecular weights are known. Examples of polyisobutene produced by BASF are: with low molecular weight: Glissopal®V types, such as Glissopal®V190, Glissopal®V 500, Glissopal®V 640, Glissopal®V 1500; with medium molecular weight: Oppanol®B types, such as Oppanol®B 10, Oppanol®B 11, Oppanol®B 12, Oppanol®B 13, Oppanol®B 14, Oppanol®B 15; with a high molecular weight: Oppanol®B types, such as Oppanol®B 30, Oppanol®B 50, Oppanol®B 80. Examples produced by ExxonMobil Chemical Company are Vistanec LM-MH, LM-MS and LM-H.

Polyisobutene can be used as one type of polyisobutene or as a blend of different types of polyisobutene.

In a more preferred embodiment, said polyisobutene is comprised in an amount between 7% wt. and 60% wt. relative to the total weight of said emulsion. More preferably, said amount of polyisobutene is comprised between 7% wt. and 55% wt. relative to the total weight of said emulsion. Even more preferably, said amount of polyisobutene is comprised between 10% wt. and 55% wt. relative to the total weight of said emulsion. Even more preferably, said amount of polyisobutene is comprised between 15% wt. and 55% wt. relative to the total weight of said emulsion. Most preferably, said polyisobutene is comprised in an amount of 16% wt., 18% wt., 20% wt., 22% wt., 24% wt., 26% wt., 28% wt., 30% wt., 32% wt., 34% wt., 36% wt., 38% wt., 40% wt., 42% wt., 44% wt., 46% wt., 48% wt., 50% wt., 52% wt., 54% wt. or any amount there in between relative to the total weight of said emulsion.

In a preferred embodiment, said polyisobutene is a high molecular weight polymer with an average molecular weight between 100001 g/mol and 500000 g/mol and is comprised in an amount between 5% wt. and 50% wt. relative to the total weight of said emulsion. More preferably, said amount of polyisobutene is comprised between 5% wt. and 40% wt. relative to the total weight of said emulsion. Even more preferably, said amount of polyisobutene is comprised between 5% wt. and 30% wt. relative to the total weight of said emulsion. Even more preferably, said amount of polyisobutene is comprised between 5% wt. and 25% wt. relative to the total weight of said emulsion. Most preferably, said polyisobutene is comprised in an amount of 6% wt., 7% wt., 8% wt., 9% wt., 10% wt., 11% wt., 12% wt., 13% wt., 14% wt., 15% wt., 16% wt., 17% wt., 18% wt., 19% wt., 20% wt., 21% wt., 22% wt., 23% wt., 24% wt. or any amount there in between relative to the total weight of said emulsion.

In a preferred embodiment, said polyisobutene is a low or medium molecular weight polymer with an average molecular weight up to 100000 g/mol and is comprised in an amount between 10% wt. and 60% wt. relative to the total weight of said emulsion. More preferably, said amount of polyisobutene is comprised between 15% wt. and 60% wt. relative to the total weight of said emulsion. Even more preferably, said amount of polyisobutene is comprised between 20% wt. and 60% wt. relative to the total weight of said emulsion. Even more preferably, said amount of polyisobutene is comprised between 25% wt. and 60% wt. relative to the total weight of said emulsion. Even more preferably, said amount of polyisobutene is comprised between 25% wt. to 55% wt. relative to the total weight of said emulsion. Most preferably, said polyisobutene is comprised in an amount of 26% wt., 28% wt., 30% wt., 32% wt., 34% wt., 36% wt., 38% wt., 40% wt., 42% wt., 44% wt., 46% wt., 48% wt., 50% wt., 52% wt., 54% wt. or any amount there in between relative to the total weight of said emulsion.

In a preferred embodiment, the present invention provides in an aqueous polyisobutene emulsion, wherein said water is comprised in an amount of 30% wt. to 70% wt., based on the total weight of said emulsion.

In a more preferred embodiment, said water is comprised in an amount between 35% wt. and 70% wt. relative to the total weight of said emulsion. More preferably, said amount of water is comprised between 35% wt. and 65% wt. relative to the total weight of said emulsion. Even more preferably, said amount of water is comprised between 35% wt. and 60% wt. relative to the total weight of said emulsion. Even more preferably, said amount of water is comprised between 45% wt. and 55% wt. relative to the total weight of said emulsion. Most preferably, said water is comprised in an amount of 46% wt., 47% wt., 48% wt., 49% wt., 50% wt., 51% wt., 52% wt., 53% wt., 54% wt. or any amount there in between relative to the total weight of said emulsion.

In a preferred embodiment, the present invention provides in an aqueous polyisobutene emulsion, whereby said wax is selected from the group comprising animal waxes, vegetable waxes, mineral waxes, petroleum waxes, polyolefin waxes, amide waxes, chemically modified waxes and combinations thereof, and whereby said oil is selected from the group comprising natural and mineral oils and combinations thereof.

Suitable waxes include both natural and synthetic waxes. Suitable waxes include animal waxes, such as bees wax, Chinese wax, wax shellac, spermaceti and wool wax; vegetable waxes such as bayberry wax, palm wax, candelilla wax, carnauba wax, castor oil wax, asparto wax, Japanese wax, jojoba oil wax, ouricury wax, rice bran wax and soybean wax; mineral waxes such as ceresin waxes, montan wax, ozokerite wax and turf wax; petroleum waxes, such as paraffin and microcrystalline waxes, and synthetic waxes, such as polyolefin waxes, including polyethylene and polypropylene waxes, polytetrafluoroethylene waxes (PTFE wax), Fischer-Tropsch waxes, stearamide waxes (including ethylene-bis-stearamide waxes), polymerized α-olefin wax, substituted amide waxes (for example, esterified or saponified substituted amide waxes) and other chemically modified waxes, such as PTFE-modified polyethylene wax, as well as combinations of the above. Preferably these waxes include paraffin wax, microcrystalline wax, Fischer-Tropsch waxes, linear and branched polyethylene waxes, polypropylene waxes, carnauba wax, ethylene-bis-stearamide (EBS) wax and combinations thereof.

Suitable oils include both natural and mineral oils. Natural oils comprise e.g. soybean oil, olive oil, sesame oil, cotton seed oil, castor oil, coconut oil, canola oil and palm oil, mineral oils such as paraffinic and/or naphthenic oils and petroleum jelly.

Other examples of suitable waxes and suitable oils are reported in US20110275738A1, U.S. Pat. No. 7,153,516B2, US20080274073A1 and U.S. Pat. No. 7,767,748B2, and are hereby included by reference.

One of the advantages of the above described composition is that it allows for further reduction of the tackiness and viscosity of the resulting polyisobutene emulsion.

In a preferred embodiment, the present invention provides in an aqueous polyisobutene emulsion, wherein said wax and/or said oil are comprised in an amount between 5% wt. and 50% wt., based on the total weight of said emulsion.

In a more preferred embodiment, said wax and/or oil is comprised in an amount between 10% wt. and 50% wt. relative to the total weight of said emulsion. More preferably, said wax and/or oil is comprised in an amount between 15% wt. and 50% wt. relative to the total weight of said emulsion. Even more preferably, said wax and/or oil is comprised in an amount between 20% wt. and 50% wt. relative to the total weight of said emulsion. Even more preferably, said wax and/or oil is comprised in an amount between 25% wt. and 50% wt. relative to the total weight of said emulsion. Most preferably, said wax and/or oil is comprised in an amount of 26% wt., 28% wt., 30% wt., 32% wt., 34% wt., 36% wt., 38% wt., 40% wt., 42% wt., 44% wt., 46% wt., 48% wt. or any amount there in between relative to the total weight of said emulsion.

In a preferred embodiment, the present invention provides in an aqueous polyisobutene emulsion, whereby said surfactant comprises an atom group selected from the group comprising a carboxylate, sulphonate, sulphate, phosphonate, phosphate, alkyl or phenyl ammonium, pyridinium, imidazole or imidazolin quats, quaternairy N-cation, betain, polyether, polyol, fatty acid or derivatives thereof, alcohol alkoxylate and alcohol ether, and any combination of such surfactants.

A surfactant or surface-active compound for the synthesis of emulsions and dispersions is often also termed emulsifier. A surfactant comprises normally a hydrophobic and a hydrophilic part. Thereby, the hydrophobic part comprises normally 4 to 20 carbon atoms, preferably 6 to 19 carbon atoms and even more preferably 8 to 18 carbon atoms.

A wide range of surface-active compounds can be used as emulsifiers. Preferably, the used emulsifier will be selected from the group of anionic, cationic or non-ionic surface-active compounds.

Anionic surface-active compound comprise saponified fatty acids and derivatives of fatty acids with carboxylic groups such as sodium dodecylsulphate (SDS), sodium dodecyl benzene sulphonate, sulphates and sulphonates and abietic acid.

Examples of anionic surfactants are also: carboxylates, sulphonates, sulpho fatty acid methyl esters, sulphates, phosphates.

A carboxylate is a compound which comprises at least one carboxylate group in the molecule. Examples of carboxylates are:
  soaps, such as stearates, oleates, cocoates of alkaline metals or of ammonium, alkanol amines
  ether carboxylates, such as Akypo® RO20, Akypo® RO50, Akypo® RO90

A sulphonate is a compound, that comprises at least one sulphonate group in the molecule. Examples of sulphonates are:
  Alkyl benzene sulphonates, such as Lutensit® A-LBS, Lutensit® A-LBN, Lutensit® A-LBA, Marlon® AS3, Maranil® DBX
  Alkyl naphtalene sulphonates condensed with formaldehyde, lignine sulphonates, such as e.g. Borresperse NA, Tamol NH7519
  Alkyl sulphonates, such as Alscoap OS-14P, BIO-TERGE® AS-40, BIO-TERGE® AS-40 CG, BIO-TERGE® AS-90 Beads, Calimulse® AOS-20, Calimulse® AOS-40, Calsoft® AOS-40, Colonial® AOS-40, Elfan® OS 46, Ifrapon® AOS 38, Ifrapon® AOS 38 P, Jeenate® AOS-40, Nikkol® OS-14, Norfox® ALPHA XL, POLYSTEP® A-18, Rhodacal® A-246L, Rhodacal® LSS-40/A
  Sulphonated oil, such as Turkish red oil
  Olefin sulphonates
  Aromatic sulphonates, such as Nekal® BX, Dowfax® 2A1

A sulphate is a compound that comprises at least one $SO_4$-group in the molecule. Examples of sulphates are:
  Fatty acid alcohol sulphates, such as coco fatty acid alcohol sulphate (CAS 97375-27-4), e.g. EMAL®10G, Dispersogen®SI, Elfan® 280, Mackol® 100N
  Other alcohol sulphates, such as Emal® 71, Lanette® E
  Coco fatty acid alcohol ether sulphates, such as EMAL® 20C, Latemul® E150, Sulphochem® ES-7, Texapon® ASV-70 Spec., Agnique SLES-229-F, Octosol 828, POLYSTEP® B-23, Unipol® 125-E, 130-E, Unipol® ES-40
  Other alcohol ether sulphates, such as Avanel® S-150, Avanel® S 150 CG, Avanel® S150 CG N, Witcolate® D51-51, Witcolate® D51-53.

A phosphate is a compound that comprises at least one $PO_4$-group in the molecule. Examples of phosphates are:
  Alkyl ether phosphates, such as Maphos® 37P, Maphos® 54P, Maphos® 37T, Maphos® 210T, Maphos® 210P
  Phosphates such as Lutensit A-EP
  Alkyl phosphates The anionic surfactants are preferable added to salt. Salts are preferably alkaline metal salts, such as sodium, potassium, lithium, ammonium, hydroxylethyl ammonium, di(hydroxyethyl) ammonium and tri(hydroxyethyl) ammonium salts or alkanol amine salts.

Cationic surface-active compounds comprise dialkyl benzene alkyl ammonium chloride, alkyl benzyl methyl ammonium chloride, alkyl benzyl dimethyl ammonium bromide, benzalkonium chloride, cetyl pyridinium bromide, $C_{12}$, $C_{15}$, or $C_{17}$ trimethyl ammonium bromides, halide salts of quaternary polyoxy-ethylalkyl amines, dodecyl benzyl triethyl ammonium chloride and benzalkonium chloride.

Examples of cationic surfactants are also: quaternary ammonium compounds. A quaternary ammonium compound is a compound, that comprises at least one $R_4N^+$-group in the molecule. Examples of counter ions that can be used in quaternary ammonium compounds are:
  Halogen, methosulphates, sulphates and carbonates of coco fat or cetyl/oleyl trimethyl ammonium.

Preferably, the following cationic surfactants are used:
  N,N-dimethyl-N-(hydroxy-$C_7$-$C_{25}$-alkyl) ammonium salts
  Mono- and di($C_7$-$C_{25}$-alkyl) dimethyl ammonium compounds Ester quats, especially mono-, di- and trialkanol amines, quaternary esterificated with $C_8$-$C_{22}$ carboxylic acids.

Imidazolin quats, especially 1-alkylimidazolinium salts.

A betain surfactant is a compound that, under conditions of use, comprises at least one positive charge and at least one negative charge. An alkyl betain is a betain surfactant that comprises at least one alkyl unit per molecule. Examples of betain surfactants are:

Cocamidopropylbetain, such as MAFO® CAB, Amonyl® 280BE, Amphosol® CA, Amphosol® CG, Amphosol® CR, Amphosol® HCG, Amphosol® HCG-50, Chembetaine® C, Chembetaine® CGF, Chembetaine® CL, Dehyton® PK, Dehyton® PK 45, Emery® 6744, Empigen® BS/F, Empigen® BS/FA, Empigen® BS/P, Genagen® CAB, Lonzaine® C, Lonzaine® CO, Mirataine® BET-C-30, Mirataine® CB, Monateric® CAB, Naxaine® C, Naxaine® CO, Norfox® CAPB, Norfox® Coco Betaine, Ralufon® 414, TEGO®-Betain CKD, TEGO® Betain E KE 1, TEGO®-Betain F, TEGO®-Betain F 50, and aminoxides such as alkyl dimethyl amineoxide.

Non-ionic surfactants comprise polyvinyl alcohol, polyacrylic acid, methalose, methyl cellulose, ethyl cellulose, propyl cellulose, hydroxy ethyl cellulose, carboxymethyl cellulose, natural gum, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol.

Non-ionic surfactants have a neutral, polar and hydrophilic head that makes non-ionic surfactants water-soluble. Such surfactants adsorb at surfaces and aggregate to micelles above their critical micelle concentration. Depending on the type of head, different surfactants can be identified, such as (oligo)oxyalkylene groups, and especially (oligo)oxyethylene groups, (polyethylene)glycol groups and carbohydrate groups, such as alkyl polyglucosides and fatty acid N-methyl glucamides.

Alcohol phenolalkoxylates are compounds that can be produced through addition of alkylene oxide, preferably ethylene oxide, to alkyl phenols. Non-limiting examples are: Norfox® OP-102, Surfonic® OP-120, T-Det® O-12.

Fatty acid ethoxylates are fatty acid esters, that are treated with different amounts of ethylene oxide.

Triglycerides are esters of glycerol (glycerides), in which all three hydroxyl groups are esterificated with fatty acids. These can be modified with alkylene oxides. Fatty acid alcohol amides comprise at least one amide group with an alkyl group and one or two alkoxyl groups. Alkyl polyglycosides are mixtures of alkyl monoglucosides (alkyl-α-D- and -β-D-glucopyranoside with a small amount-glucofuranoside), alkyl diglucosides (-isomaltosides, -maltosides and others) and alkyloligoglucosides (-maltotriosides, -tetraosides and others).

Alkyl polyglycosides can non-limiting be synthesized with an acid catalysed reaction (Fisher reaction) of glucose (or starch) or n-butylglycosides with fatty acid alcohols. Further, also alkyl polyglycosides can be used as non-ionic surfactant. A non-limiting example is Lutensol® GD70. In addition, also non-ionic N-alkylated, preferably N-methylated, fatty acid amides can be used as surfactant.

Alcohol alkoxylates comprise a hydrophobic part with a chain length of 4 to 20 carbon atoms, preferably 6 to 19 C-atoms and more preferably 8 to 18 C-atoms, whereby the alcohol can be linear or branched, and a hydrophilic part that comprises alkoxylate units, such as ethylene oxide, propylene oxide and/or butylene oxide, with 2 to 30 repeating units. Non-limiting examples are: Lutensol® XP, Lutensol® XL, Lutensol® ON, Lutensol® AT, Lutensol® A, Lutensol® AO, Lutensol® TO.

Other examples of suitable surfactants are reported in US20110275738A1, U.S. Pat. No. 7,153,516B2, US20080274073A1 and U.S. Pat. No. 7,767,748B2, and are hereby included by reference.

In a preferred embodiment, the present invention provides in an aqueous polyisobutene emulsion, wherein said one or more surfactants are comprised in an amount between 2% wt. and 4% wt., based on the total weight of said emulsion.

In a more preferred embodiment, said one or more surfactants are comprised in an amount of 2.2% wt., 2.4% wt., 2.6% wt., 2.8% wt., 3.0% wt., 3.2% wt., 3.4% wt., 3.6% wt. or 3.8% wt., or any amount in between.

Use of a relatively low amount of surfactants provides the advantage that the resulting emulsion is relatively less hydrophilic. Consequently, the resulting emulsion attracts less water, thereby providing a less tacky emulsion. Such emulsion with reduced tackiness is of interest for selected chemical-technical applications.

A In a preferred embodiment, the present invention provides in an n aqueous polyisobutene emulsion, further comprising at least one additive in an amount between 0.01% wt. and 10% wt., based on the total weight of said emulsion.

In a more preferred embodiment, said additive is selected from a group of additives used in chemical-technical applications, such as glue systems, cosmetic, plant protection, preparation and treatment of paper, production and processing of textiles and leather, coatings, pharmaceutical applications, construction, wood treatment, water and gas barrier for, e.g., methane, carbon dioxide, radon, protective coating for radio-active radiation; or additives having bacterial and/or microbiological activity.

In a more preferred embodiment, said additive is comprised in an amount between 0.01% wt. and 10% wt. More preferably, said additive is comprised in an amount between 0.05% wt. and 5% wt., and even more preferably said additive is added in an amount of 0.2% wt., 0.3% wt., 0.4% wt., 0.5% wt., 0.6% wt., 0.7% wt., 0.8% wt., 0.9% wt., 1.0% wt., 1.1% wt., 1.2% wt., 1.3% wt., 1.4% wt., 1.5% wt., 1.6% wt., 1.7% wt., 1.8% wt., 1.9% wt., 2.0% wt., 2.1% wt., 2.2% wt., 2.3% wt., 2.4% wt., 2.5% wt., 2.6% wt., 2.7% wt., 2.8% wt., 2.9% wt. or any value there in between. Most preferably, the amount of additive to be used is dependent on the function of said additive and will be clear for the technical person skilled in the art.

Additives can have a positive influence on the production process of the emulsion, and may provide certain desired characteristics to the emulsions. An example of possibly used additives are, inter alia, bases to optimize the saponification process, as well as bactericides, dyes, viscosity modifiers for increase or reduction of the viscosity, antifoaming agents, de-foaming agents. It should be clear to one skilled in the art that these are just examples of possibly used additives, and that other options are also possible.

Other examples of suitable additives are reported in US20110275738A1, U.S. Pat. No. 7,153,516B2, US20080274073A1 and U.S. Pat. No. 7,767,748B2, and are hereby included by reference.

In a preferred embodiment, the present invention provides in an aqueous polyisobutene emulsion, whereby said emulsion has a viscosity comprised between 30 mPa·s and 2000 mPa·s as determined with a Brookfield viscometer at 20° C.

In a more preferred embodiment, said viscosity is comprised between 40 mPa·s and 1600 mPa·s. More preferably, said viscosity is comprised between 50 mPa·s and 1200 mPa·s. Most preferably, said viscosity is 75 mPa·s, 100 mPa·s, 125 mPa·s, 150 mPa·s, 175 mPa·s, 200 mPa·s, 225 mPa·s, 250 mPa·s, 275 mPa·s, 300 mPa·s, 325 mPa·s, 350 mPa·s, 375 mPa·s, 400 mPa·s, 425 mPa·s, 450 mPa·s, 475 mPa·s, 500 mPa·s, 525 mPa·s, 550 mPa·s, 575 mPa·s, 600 mPa·s, 625 mPa·s, 650 mPa·s, 675 mPa·s, 700 mPa·s, 725 mPa·s, 750 mPa·s, 775 mPa·s, 800 mPa·s, 825 mPa·s, 850 mPa·s, 875 mPa·s, 900 mPa·s, 925 mPa·s, 950 mPa·s, 975 mPa·s, 1000 mPa·s, 1025 mPa·s, 1050 mPa·s, 1075 mPa·s, 1100 mPa·s, 1125 mPa·s, 1150 mPa·s, 1175 mPa·s or any value there in between.

The viscosity of an aqueous polyisobutene emulsion is related to good flowing properties and is related to the ease of handling and the energetic input that is required for manipulating said emulsion. A comparatively low viscosity generally gives rise to a polyisobutene emulsion with good flowing properties and a low energetic input for manipulation said emulsion.

In a preferred embodiment, the present invention provides in an aqueous polyisobutene emulsion, whereby water separation of said emulsion is at maximum 50% upon treatment in a centrifuge for 60 minutes at a rotation speed of 2300 G.

In a more preferred embodiment, said water separation upon treatment in a centrifuge for 60 minutes at a rotation speed of 2300 G of said emulsion is at maximum 40%. More preferably, said water separation upon treatment in a centrifuge for 60 minutes at a rotation speed of 2300 G of said emulsion is at maximum 20%. Even more preferably, said water separation upon treatment in a centrifuge for 60 minutes at a rotation speed of 2300 G of said emulsion is at maximum 10%. Most preferably, said water separation upon treatment in a centrifuge for 60 minutes at a rotation speed of 2300 G of said emulsion is 9%, 8%, 7%, 6%, 5%, 4%, 3%, 2%, 1%, 0% or any value there in between.

A reduced degree of water separation is generally related to a high stability and shelf-life of the emulsion. E.g., a degree of water separation lower than 35% of an aqueous polyisobutene emulsion upon treatment in a centrifuge for 60 minutes at a rotation speed of 2300 G, indicates a stability of at least 6 months. Preferably, the present invention relates to an aqueous polyisobutene emulsion that is stable for at least 9 months. More preferably, the present invention relates to an aqueous polyisobutene emulsion that is stable for at least 12 months. Even more preferably, the present invention relates to an aqueous polyisobutene emulsion that is stable for at least 18 months. Most preferably, the present invention relates to an aqueous polyisobutene emulsion that is stable for at least 24 months.

In a second aspect, the present invention provides in an aqueous polyisobutene emulsion, obtainable by a process comprising the steps of:
heating 1% wt. to 65% wt., based on the total weight of said emulsion, polyisobutene polymer, optionally mixing said polyisobutene polymer with 1% wt. to 65% wt., based on the total weight of said emulsion, of a wax and/or oil, thereby obtaining a pre-mix,
mixing said pre-mix in water containing one or more surfactants in a concentration of said one or more surfactants of at maximum 5% wt. at a controlled flow rate, which flow rate is sufficiently slow to form particles of the pre-mix, thereby obtaining a pre-emulsion, and
homogenising said pre-emulsion, thereby obtaining said polyisobutene emulsion with an average particle size of not greater than 100 μm.

In a more preferred embodiment, said polyisobutene emulsion has an average particle size of not greater than 90 μm. More preferably, said polyisobutene emulsion has an average particle size of not greater than 80 μm. More preferably, said polyisobutene emulsion has an average particle size of not greater than 70 μm. Even more preferably, said polyisobutene emulsion has an average particle size of not greater than 60 μm.

In a preferred embodiment, the present invention provides in an aqueous polyisobutene emulsion, obtainable by a process as described above, wherein the average particle size of said emulsion is not greater than 50 μm.

In a more preferred embodiment, said polyisobutene emulsion is obtainable by a process a described above, whereby the average particle size is comprised between 100 nm and 40 μm. More preferably, said polyisobutene emulsion is obtainable by a process a described above, whereby the average particle size is comprised between 200 nm and 30 μm. Even more preferably, said polyisobutene emulsion is obtainable by a process a described above, whereby the average particle size is comprised between 250 nm and 25 μm. Most preferably, said polyisobutene emulsion is obtainable by a process a described above, whereby the average particle size is 500 nm, 750 nm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm or any value there in between.

Some of the advantages of an aqueous polyisobutene emulsion obtained by the above described process is that the average particle size of the polyisobutene emulsion is significantly reduced and that the particle size distribution of said polyisobutene emulsion is relatively low. Thereby, a polyisobutene emulsion with small average particle size and a uniform particle size distribution is obtained, which gives rise to good flowing properties, low tackiness, relatively low viscosities and high stability, as determined by water separation experiments, of said emulsion.

Generally, it can be assumed that the emulsification process for the synthesis of an emulsion consists of the following steps: a pre-mix step of the individual components to form a pre-emulsion and the effective emulsification. To achieve a certain fineness of the droplets, several options are known in the state of the art. Potentially useful systems include the use of movable rotating agitators, rotor-stator devices, pressure relief devices, homogenizers and other blasting devices, ultrasonic devices and membrane emulsification devices.

The most used are the pressure homogenizers devices. The principle of this is the pre-pressurization of the pre-emulsion or dispersion, followed by a forceful pressure release, thus the mechanical energy is transferred to the pre-dispersion. A commonly used system according to such well-known state of the art comprises a reaction vessel and a high-pressure homogenizer such as a Gaulin 15MR of the APV Homogenizer Group. The reaction is preferentially carried out with a heating and cooling system. The necessary components are brought together in the reaction vessel, after which the mixture is mixed and heated to a certain temperature. A high temperature will normally result in smaller average particle size of the dispersion phase in the final emulsion. While doing so, the melting points and flash points of the various components should be taken into account.

Once the desired temperature has been reached, the mixture is sent through a homogenizer. Use of a high pressure homogenizer ensures a reduction in the average particle size of the components of the dispersant phase, whereby the applied pressure can range within the scope from a few hundred to a thousand bar. This process is well-known in the prior art and, inter alia, cited in U.S. Pat. No. 3,579,461 and U.S. 2009 0197105. Once the emulsification process is finished, the reaction mixture must be cooled down, preferably to room temperature.

Generally, the particles obtained during the emulsification process will have an average particle size in the range of 10 nm to 100 μm, depending on the homogenisation conditions and on the size of the molecular weight of the polyisobutenes. Generally it can be stated that the smaller the average particle size, the more stable the emulsion.

Once the emulsion is formed, the homogenization process will be stopped and the emulsion is to be cooled. Preferably, the emulsion is cooled to the desired end temperature ranging from 20° C. to 40° C., preferably from 20 to 25° C. It is extremely important that this cooling process is carried out as efficiently as possible because the speed at which the emulsion is cooled down has an impact on the quality of the resulting emulsion. The faster the cooling to a desired temperature can be accomplished, the higher the quality of the resulting emulsion. Furthermore, it is economically advantageous to promote the production of the emulsions as efficiently and quickly as possible.

In a third aspect, the present invention provides in a use of an aqueous polyisobutene emulsion as described above in a chemical-technical application, such as glue systems, cosmetic, plant protection, preparation and treatment of paper, production and processing of textiles and leather, coatings, medical or pharmaceutical applications, construction, wood treatment, water and gas barrier for, e.g., methane, carbon dioxide, radon, protective coating for radioactive radiation.

The composition and method as described above, lead to stable emulsions with very fine particles. The viscosity can vary from thin liquid emulsions (see also Examples 1-3 and 5-9) to highly viscous emulsions (see Example 4).

EXAMPLES

In what follows, the invention is described using non-limiting examples which illustrate the invention, and which are not intended nor can be interpreted to limit the scope of the invention.

Below are some examples. The values in the table represent the mass ratios.

(*) The stability test is carried out by acceleration in a centrifuge, so that an accelerated aging treatment occurs in the emulsion. When $H_2O$ separation is lower than 35%, a stability of at least 6 months is guaranteed.

(**) The particle size distribution is determined using a Beckman Coulter LS 13 320 laser diffractometer MW.

Example 1

In a first example, compounds are weighed according to the amounts stated in Table 1.

TABLE 1

Amount and type of compounds used for the preparation of an emulsion according to example 1.

| Oppanol B30 | 250 |
| Stearic acid | 20 |

TABLE 1-continued

Amount and type of compounds used for the preparation of an emulsion according to example 1.

| Diethanol amine | 9 |
| Paraffin wax, melting point 60° C. | 220 |
| Biocide | 1 |
| Water | 500 |

220 grams of paraffin wax with a melting point of 60° C. is administered to a round-walled vessel without any baffles. Said vessel comprising said paraffin is heated to 140° C. using a heating plate. Said vessel is provided with a mixing device and the stirring rate is set at 400 rpm.

250 grams of Oppanol B30 is cut in small pieces of a maximum weight of 3 grams and is administered gradually to said vessel comprising said paraffin such that Oppanol B30 does not coagulate. Viscosity of the mixture of paraffin with Oppanol B30 is monitored until constant, thereby obtaining a pre-mix. Then, the pre-mix is cooled down to 70° C. to 80° C.

A homogeniser is preheated by purging with hot water (80° C.) for 30 minutes. Said water is evacuated and 500 grams of water (70° C.-80° C.) is administered to the reactor. Water is added to the emulsion during the preparation in order to keep the total amount of water within the range of the original mass of water±5% wt. to compensate the loss of water due to evaporation. Said reactor is provided with a mixing device and the stirring rate is set at 600 rpm.

Subsequently, 20 grams of stearic acid and 10 grams of diethanol amine is administered to the reactor comprising water (70° C.-80° C.).

Homogenisation is started in recycling with a pressure setting in a first phase in the $1^{st}$ step at 250 bar and in the $2^{nd}$ step at 20 bar.

Said pre-mix (70° C.-80° C.) is steadily administered to the stirred water in the vortex over a time span of 2 minutes to 20 minutes. The average particle size of the emulsion is monitored. Homogenisation in the first phase takes 30 to 60 minutes. Homogenisation in a second phase takes place at 350 bar in the $1^{st}$ step and at 30 bar in the $2^{nd}$ step. The average particle size of the emulsion is monitored. Homogenisation in the second phase takes about 30 to 60 minutes. Homogenisation in a third phase takes place at 500 bar in the $1^{st}$ step and at 50 bar in the $2^{nd}$ step. The average particle size of the emulsion is monitored. Homogenisation in the third phase takes about 30 to 60 minutes. Finally, the emulsion is cooled down to room temperature, thereby obtaining a polyisobutene emulsion with physical properties as described in Table 2.

Viscosity of the obtained emulsion is determined using a Brookfield viscometer (LV-2) at 100 rpm at room temperature (20° C.).

Stability of the emulsion is determined by the percentage of water separation in a stability-by-centrifugation method. In this method, a test cylinder with volume marks is filled with 10 mL of a homogenised test emulsion. The test cylinder with emulsion is placed in a centrifuge for 60 minutes and treated at a speed of 2300 G. The average particle size and the particle size distribution of the emulsion is determined using a Beckman-Coulter LS13 320 Laser Diffraction Particle Size Analyser with Universal Liquid Module.

TABLE 2

Selected physical properties of the emulsion according to example 1.

| | |
|---|---|
| Solid content (%) | 51.87 |
| Density | 0.9413 g/ml |
| Brookfield viscosity (LV-2, 100 rpm) | 199.2 mPa · s |
| Stability (*) (% H₂O separation) | 4 |

In an analogous way, the following emulsions are obtained.

Example 2

TABLE 3

Amount and type of compounds used for the preparation of an emulsion according to example 2.

| | |
|---|---|
| Glissopal V1500 | 465.9 |
| Stearic acid | 17.7 |
| Diethanol amine | 7 |
| Steareth-10 | 8.4 |
| Biocide | 1 |
| Water | 500 |

TABLE 4

Selected physical properties of the emulsion according to example 2.

| | |
|---|---|
| Solid content (%) | 50.13 |
| Density | 0.9417 g/ml |
| Brookfield viscosity (LV-2, 100 rpm) | 82.2 mPa · s |
| Stability (*) (% H₂O separation) | 8 |

Example 3

TABLE 5

Amount and type of compounds used for the preparation of an emulsion according to example 3.

| | |
|---|---|
| Glissopal V640 | 599 |
| Polysorbate 40 | 15 |

TABLE 5-continued

Amount and type of compounds used for the preparation of an emulsion according to example 3.

| | |
|---|---|
| Polysorbate 60 | 15 |
| Biocide | 1 |
| Water | 370 |

TABLE 6

Selected physical properties of the emulsion according to example 3.

| | |
|---|---|
| Solid content (%) | 63.13 |
| Density | 0.9106 g/ml |
| Brookfield viscosity (LV-2, 100 rpm) | 225 mPa · s |
| Stability (*) (% H₂O separation) | 10 |

Example 4

TABLE 7

Amount and type of compounds used for the preparation of an emulsion according to example 4.

| | |
|---|---|
| Oppanol B15 | 160.3 |
| Stearic acid | 17.7 |
| Diethanol amine | 14 |
| Tamol NH7519 | 5.3 |
| Polyvinyl alcohol | 20 |
| Biocide | 1 |
| Carnauba wax | 40 |
| Paraffin wax, melting point 60° C. | 241.7 |
| Water | 500 |

TABLE 8

Selected physical properties of the emulsion according to example 4.

| | |
|---|---|
| Solid content (%) | 49.4 |
| Density | 0.9315 g/ml |
| Brookfield viscosity (LV-2, 100 rpm) | 1193 mPa · s |
| Stability (*) (% H₂O separation) | <0.5% |

TABLE 9

Amount and type of compounds used for the preparation of an emulsion according to examples 5-9.

| Example | Polyolefin | Surfactants | Water | Wax/oil | Additives |
|---|---|---|---|---|---|
| Example 5 | Glissopal V190 47% wt. | sodium alkyl benzene sulphonate 2.2% wt. | 50.5% wt. | none | Protectol HT (biocide) 0.1% wt. Sudan III, C.I. 26100 (colorant) 0.1% wt. anti-foam concentrate (anti-foaming agent) 0.1% wt. |
| Example 6 | Oppanol B30 20% wt. | Polysorbate 40 1.5% wt. Polysorbate 60 1.5% wt. | 46.9% wt. | F-T wax, melting point 60° C., 30% wt. | Mergal K9N (biocide) 0.1% wt. |
| Example 7 | Oppanol B15 27.8% wt. | Stearic acid 2% wt. diethanol amine 1% wt. | 50% wt. | mineral oil, viscosity 60 cSt at 40° C. 19.2% wt. | none |

TABLE 9-continued

Amount and type of compounds used for the preparation of an emulsion according to examples 5-9.

| Example | Polyolefin | Surfactants | Water | Wax/oil | Additives |
|---|---|---|---|---|---|
| Example 8 | Oppanol B10 40% wt. | Stearic acid 1% wt. diethanol amine 0.5% wt. Steareth-10 1.5% wt. | 50% wt. | Luwax OA (polyethylene wax) 7% wt. | none |
| Example 9 | Oppanol B50 7% wt. | Steareth-10 1.5% wt. nonoxynol-9 1.5% wt. | 60% wt. | paraffin wax, melting point 55° C. 29.9% wt. | Mergal K9N (biocide) 0.1% wt. |

% wt. = % by weight = percentage by weight

It is understood that the current invention is not limited to the examples described herein and that adjustments or changes at the described examples can be added without re-evaluating the claims.

What is claimed is:

1. An aqueous polyisobutene emulsion comprising:
   1% wt. to 65% wt., based on the total weight of said emulsion, of a high molecular weight polyisobutene with an average molecular weight of 100001 g/mol to 500000 g/mol,
   at maximum 5% wt., based on the total weight of said emulsion, of at least one surfactant, and
   optionally 1% wt. to 65% wt., based on the total weight of said emulsion, of at least one wax and/or oil,
   complemented with water to 100% wt., wherein the average particle size of said polyisobutene emulsion is not greater than 100 μm.

2. An aqueous polyisobutene emulsion according to claim 1, whereby the average particle size of said polyisobutene emulsion is not greater than 50 μm.

3. An aqueous polyisobutene emulsion according to claim 1, wherein the average particle size of said polyisobutene emulsion is not less than 250 nm and not greater than 25 μm.

4. An aqueous polyisobutene emulsion according to claim 1, wherein said polyisobutene is comprised in an amount between 5% wt. and 60% wt., based on the total weight of said emulsion.

5. An aqueous polyisobutene emulsion according to claim 1, wherein said water is comprised in an amount between 1% wt. and 70% wt., based on the total weight of said emulsion.

6. An aqueous polyisobutene emulsion according to claim 1, wherein said wax is selected from the group consisting of animal waxes, vegetable waxes, mineral waxes, petroleum waxes, polyolefin waxes, amide waxes, chemically modified waxes and combinations thereof, and wherein said oil is selected from the group consisting of natural and mineral oils and combinations thereof.

7. An aqueous polyisobutene emulsion according to claim 6, wherein said wax and/or said oil are comprised in an amount between 5% wt. and 50% wt., based on the total weight of said emulsion.

8. An aqueous polyisobutene emulsion according to claim 1, wherein said surfactant comprises an atom group selected from the group consisting of a carboxylate, sulphonate, sulphate, phosphonate, phosphate, alkyl or phenyl ammonium, pyridinium, imidazole or imidazolin quats, quaternary N-cation, betain, polyether, polyol, fatty acid or derivatives thereof, alcohol alkoxylate and alcohol ether, and any combination of such surfactants.

9. An aqueous polyisobutene emulsion according to claim 8, wherein said surfactant is comprised in an amount between 2% wt. and 4% wt., based on the total weight of said emulsion.

10. An aqueous polyisobutene emulsion according to claim 1, further comprising at least one additive in an amount between 0.01% wt. and 10% wt., based on the total weight of said emulsion.

* * * * *

UNITED STATES PATENT AND TRADEMARK OFFICE
CERTIFICATE OF CORRECTION

PATENT NO. : 9,725,586 B2  
APPLICATION NO. : 14/414680  
DATED : August 8, 2017  
INVENTOR(S) : Lieve Taets Page 1 of 1

It is certified that error appears in the above-identified patent and that said Letters Patent is hereby corrected as shown below:

In Column 7 at Line 41, Change "quaternairy" to --quaternary--.

In Column 7 at Line 41, Change "betain," to --betaine,--.

In Column 8 at Line 9, Change "naphtalene" to --naphthalene--.

In Column 8 at Line 46, Change "hydroxylethyl" to --hydroxyethyl--.

In Column 9 at Line 4, Change "betain" to --betaine--.

In Column 9 at Line 6, Change "betain" to --betaine--.

In Column 9 at Line 6, Change "betain" to --betaine--.

In Column 9 at Line 8, Change "betain" to --betaine--.

In Column 9 at Line 9, Change "Cocamidopropylbetain," to --Cocamidopropylbetaine,--.

In Column 9 at Line 19, Change "TEGO®-Betain" to --TEGO®-Betaine--.

In Column 9 at Line 19, Change "TEGO® Betain" to --TEGO®-Betaine--.

In Column 9 at Line 20, Change "TEGO® Betain" to --TEGO®-Betaine--.

In Column 9 at Line 20, Change "TEGO®-Betain" to --TEGO®-Betaine--.

In Column 10 at Line 24, Change "A In a preferred embodiment," to --In a preferred embodiment,--.

In Column 18 at Line 34, In Claim 8, change "betain," to --betaine,--.

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*